(12) United States Patent  (10) Patent No.: US 9,035,663 B2
Carley  (45) Date of Patent: May 19, 2015

(54) CAPACITIVE POSITION ENCODER

(75) Inventor: Carl Carley, Basingstoke (GB)

(73) Assignee: Atmel Corporation, San Jose, CA (US)

( * ) Notice: Subject to any disclaimer, the term of this patent is extended or adjusted under 35 U.S.C. 154(b) by 427 days.

(21) Appl. No.: 13/610,114

(22) Filed: Sep. 11, 2012

(65) Prior Publication Data

US 2014/0070797 A1  Mar. 13, 2014

(51) Int. Cl.
*G01R 27/26*  (2006.01)
*G01D 5/241*  (2006.01)

(52) U.S. Cl.
CPC .................................. *G01D 5/2415* (2013.01)

(58) Field of Classification Search
USPC .......................................................... 324/658
See application file for complete search history.

(56) References Cited

U.S. PATENT DOCUMENTS

| 7,663,607 | B2 | 2/2010 | Hotelling |
| 7,875,814 | B2 | 1/2011 | Chen |
| 7,920,129 | B2 | 4/2011 | Hotelling |
| 8,031,094 | B2 | 10/2011 | Hotelling |
| 8,031,174 | B2 | 10/2011 | Hamblin |
| 8,040,326 | B2 | 10/2011 | Hotelling |
| 8,049,732 | B2 | 11/2011 | Hotelling |
| 8,179,381 | B2 | 5/2012 | Frey |
| 2009/0315854 | A1 | 12/2009 | Matsuo |
| 2012/0242588 | A1 | 9/2012 | Myers et al. |
| 2012/0242592 | A1 | 9/2012 | Rothkopf et al. |
| 2012/0243151 | A1 | 9/2012 | Lynch |
| 2012/0243719 | A1 | 9/2012 | Franklin et al. |

FOREIGN PATENT DOCUMENTS

WO  WO 2012/129247  9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

*Primary Examiner* — Bot Ledynh
(74) *Attorney, Agent, or Firm* — Baker Botts LLP

(57) ABSTRACT

In one embodiment, a method comprises driving one or more drive electrodes formed on a substrate with one or more drive signals. A wiper comprising at least one arm is driven to a predetermined voltage. The wiper is electrically insulated from a plurality of sense electrodes formed on the substrate. For each sense electrode of the plurality of sense electrodes, a charge stored by the sense electrode is detected. A processor determines a position of the wiper based on the detected charges stored by the plurality of sense electrodes.

20 Claims, 4 Drawing Sheets

CAPACITIVE POSITION ENCODER

TECHNICAL FIELD

This disclosure relates generally to capacitive position encoders.

BACKGROUND

A position encoder may detect the position of a wiper. The wiper may include a shaft that is coupled to an object that causes the shaft to move. For example, the shaft may be coupled to a throttle of an engine and the position of the wiper may indicate the position of the throttle. Position encoders may be used to detect position or other metrics derived from position, such as velocity or acceleration. Position encoders may detect any suitable position, such as an angular position or a linear position. A position encoder may be attached to or provided as part of an automobile, robot, industrial control mechanism, computer, or other suitable device.

DESCRIPTION OF EXAMPLE EMBODIMENTS

Figure 1:
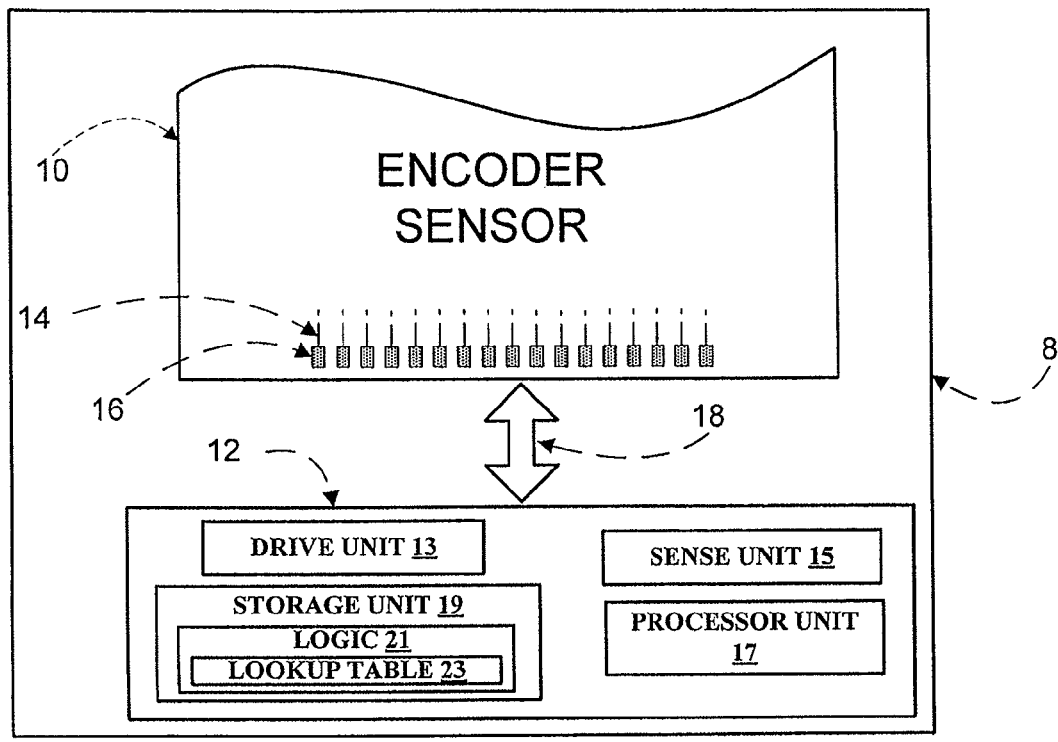
FIG. 1 illustrates an example capacitive position encoder including an example encoder sensor and an example controller.

FIG. 1 illustrates a capacitive position encoder 8 including an encoder sensor 10 and an example controller 12. Capacitive position encoder 8 may detect the position of a wiper of encoder sensor 10. For example, if capacitive position encoder 8 is a rotary encoder, it may detect an angular position of the wiper. As another example, if capacitive position encoder 8 is a linear encoder, it may detect a displacement of the wiper from a baseline position. Encoder sensor 10 may include drive and sense electrodes (or electrodes of a single type that function as both drive and sense electrodes) disposed on one or more substrates, which may be made of a dielectric material. In operation, controller 12 generates one or more drive signals and sends these drive signals to at least one drive electrode of encoder sensor 10. The drive signals transmitted to the at least one drive electrode may induce a change in charge at one or more sense electrodes that are capacitively coupled to the at least one drive electrode. A wiper of encoder sensor 10 is driven to ground. The presence of an arm of the wiper near a sense electrode induces a change in the capacitance between the sense electrode and any nearby drive electrodes. This change in capacitance affects the amount of charge stored by the sense electrode in response to a drive signal received at the one or more drive electrodes. Controller 12 senses each sense electrode by detecting an amount of charge stored by each sense electrode. By comparing the detected charges, controller 12, alone or in combination with other suitable logic (such as a processor of a device that includes capacitive position encoder 8) may determine a position of the wiper.

Capacitive position encoder 8 may be useful in many applications, including but not limited to automotive controls, robotics, industrial controls, computer input devices, measurement devices (e.g., multimeters), printers, and copiers. In particular embodiments, a shaft of the wiper is coupled to a component of a device that causes the shaft to move. By way of example, the shaft may be coupled to a throttle of an engine, a volume control, a motor shaft, a printer component, or other suitable component. By detecting the position of the wiper, the position of the component coupled to the wiper may be determined.

Because the effect of the grounded wiper arm on the capacitance between a drive electrode and a sense electrode may be similar to the effect caused by a touch or proximity input of an object such as a human finger, controller 12 may be a low-cost controller, such as a controller that is used to detect touches in a touch sensor. For example, controller 12 may be a controller that is also capable of detecting the position of touches on a slider or wheel touch tensor. In particular embodiments, the wiper arm passes over the sense electrodes of encoder sensor 10 as it moves without contacting the sense electrodes. Accordingly, the encoder sensor 10 may have a longer lifespan than an encoder that relies on contact between the moving portion of the encoder (e.g., a brush-type contact) and another portion (e.g., a metal contact) of the encoder. In such embodiments, capacitive position encoder 8 may also provide increased detection accuracy because it is not susceptible to vibration caused by the moving portion of the encoder sensor. Particular embodiments utilize multiple wiper arms to increase the accuracy of the position detection.

An electrode (whether a ground electrode, a guard electrode, a drive electrode, or a sense electrode) may be an area of conductive material forming a shape, such as for example a disc, square, rectangle, thin line (e.g., a trace disposed on a horizontal or vertical section of a substrate), wire, loop, patch, other suitable two dimensional or three dimensional shape, or any suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of a conductive material and the conductive material may occupy approximately 100% of the area of its shape (sometimes referred to as 100% fill), where appropriate. In particular embodiments, the conductive material of an electrode may occupy substantially less than 100% of the area of its shape. The electrodes may be made of any suitable conductive material such as indium tin oxide (ITO), copper, silver, a copper- or silver-based material, other metal or metal-based material, or other conductive material. In particular embodiments, an electrode may be made of one or more opaque materials such as fine lines of metal or other conductive material (FLM) and the fine lines of conductive material may occupy approximately 5% of the area of its shape in a hatched, mesh, or other suitable pattern. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of an encoder sensor may constitute in whole or in part one or more macro-features of the encoder sensor. One or more characteristics of the implementation of those shapes (such as, for example, the conductive materials, fills, or patterns within the shapes) may constitute in whole or in part one or more micro-features of the encoder sensor. One or more macro-features of an encoder sensor may determine one or more characteristics of its functionality, and one or more micro-features of the encoder sensor may determine one or more optical features of the encoder sensor, such as transmittance, refraction, or reflection.

One or more portions of the substrate of encoder sensor 10 may be made of a dielectric material, such as polyethylene terephthalate (PET), a printed circuit board (PCB) material, or another suitable material. This disclosure contemplates any suitable substrate with any suitable portions made of any suitable material.

Encoder sensor 10 may implement a capacitive form of sensing. In a mutual-capacitance implementation, encoder sensor 10 may include one or more drive electrodes and a plurality of sense electrodes sense electrodes forming capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by controller 12) may induce a charge on the sense electrode, and the amount of charge induced may be susceptible to external influence (such as a touch or the proximity of an object such as a wiper). When an object touches or comes within proximity of the capacitive node, a change in capacitance may occur at the capacitive node and controller 12 may detect the change in capacitance. For example, controller 12 may detect the change in capacitance by measuring an amount of charge stored by the sense electrode. If a change in capacitance has occurred, the charge will vary from a baseline value of charge that corresponds to the amount of charge present when no touch or proximity input has occurred. By detecting changes in capacitance among the capacitive nodes, controller 12 may determine the position of the touch or proximity input.

In a self-capacitance implementation, encoder sensor 10 may include electrodes of a single type that may each form a capacitive node. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity input. This disclosure contemplates any suitable form of capacitive sensing, where appropriate.

Encoder sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, encoder sensor 10 may have drive electrodes disposed in a pattern on one side of a substrate and sense electrodes disposed in a pattern on another side of the substrate. Moreover, encoder sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of encoder sensor 10 may indicate a touch or proximity input at the position of the capacitive node. Controller 12 may detect and process changes in capacitances at one or more capacitive nodes to determine the location of the touch or proximity input. In particular embodiments, controller 12 may communicate information about the touch or proximity input to one or more other components (such one or more central processing units (CPUs)) of a device that includes encoder sensor 10 and controller 12, which may facilitate determination of the position of the touch or proximity input. Although this disclosure describes a particular controller having particular functionality with respect to a particular device and a particular encoder sensor, this disclosure contemplates any suitable controller having any suitable functionality with respect to any suitable device and any suitable encoder sensor.

Controller 12 may be one or more integrated circuits (ICs), such as for example general-purpose microprocessors, microcontrollers, programmable logic devices or arrays, application-specific ICs (ASICs). In particular embodiments, controller 12 comprises analog circuitry, digital logic, and digital non-volatile memory. In particular embodiments, controller 12 is disposed on a flexible printed circuit (FPC) bonded to the substrate of encoder sensor 10, as described below. In other embodiments, controller 12 may be disposed directly on the substrate or coupled to the substrate in any suitable manner. The FPC may be active or passive, where appropriate. In particular embodiments, multiple controllers 12 are disposed on the FPC.

Controller 12 may include a drive unit 13, a sense unit 15, a processor unit 17, and a storage unit 19. The drive unit 13 may supply drive signals to the drive electrodes of encoder sensor 10. The drive unit may generate any suitable drive signals and transmit the drive signals to the drive electrodes of encoder sensor 10. A drive signal may include a sine wave, a square wave, a triangle wave, a wave with periodic pulses, or other suitable signal having shaped pulses. The drive signals may have any suitable frequencies.

The sense unit 15 may sense charge at the capacitive nodes of encoder sensor 10 and provide measurement signals to the processor unit representing capacitances at the capacitive nodes. In particular embodiments, sense unit 15 includes at least one analog-to-digital converter (ADC) for converting charges sensed from sense electrodes into digital values that are provided to processor unit 17.

The processor unit 17 may control the supply of drive signals to the drive electrodes by the drive unit 13 and process measurement signals from the sense unit 15 to detect and process the location of a touch or proximity input within encoder sensor 10. The processor unit 17 may also track changes in the position of a touch or proximity input within encoder sensor 10.

The storage unit 19 may store programming (e.g., logic 21) for execution by the processor unit 17, including programming for controlling the drive unit 13 to supply drive signals to the drive electrodes, programming for processing measurement signals from the sense unit 15, and other suitable programming, where appropriate. Logic 21 may also include a lookup table 23 that facilitates position determinations as described in greater detail below. Although this disclosure describes a particular controller having a particular implementation with particular components, this disclosure contemplates any suitable controller having any suitable implementation with any suitable components.

Tracks 14 of conductive material disposed on the substrate of encoder sensor 10 may couple the drive or sense electrodes of encoder sensor 10 to connection pads 16, also disposed on the substrate of encoder sensor 10. As described below, connection pads 16 facilitate coupling of tracks 14 to controller 12. As an alternative, connection pads 16 and connection 18 may be omitted and tracks 14 may run directly from controller 12 to the appropriate portion of encoder sensor 10 along the substrate. Tracks 14 may extend into or around (e.g. at the edges of) the area including the electrodes of encoder sensor 10. Particular tracks 14 may provide drive connections for coupling controller 12 to drive electrodes of encoder sensor 10, through which the drive unit 13 of controller 12 may supply drive signals to the drive electrodes. Other tracks 14 may provide sense connections for coupling controller 12 to sense electrodes of encoder sensor 10, through which the sense unit 15 of controller 12 may sense charge at the capacitive nodes of encoder sensor 10. Tracks 14 may be made of fine lines of metal or other conductive material. As an example and not by way of limitation, the conductive material of tracks 14 may be copper or copper-based. As another example, the conductive material of tracks 14 may be silver or silver-based. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths.

In addition to tracks 14, encoder sensor 10 may include one or more ground lines terminating at a ground connector (which may be a connection pad 16, a pin of controller 12, or other suitable connection). In particular embodiments, the ground connector may be at an edge of the substrate of encoder sensor 10. One or more of these ground lines may be coupled to a wiper of encoder sensor 10 as will be explained in greater detail below.

Connection pads 16 may be located along one or more edges of the substrate, outside the touch-sensitive area(s) of encoder sensor 10. As described above, controller 12 may be on an FPC. Connection pads 16 may be made of the same material as tracks 14 and may be bonded to the FPC using an anisotropic conductive film (ACF). Connection 18 may include conductive lines on the FPC coupling controller 12 to connection pads 16, in turn coupling controller 12 to tracks 14 and to the drive or sense electrodes of encoder sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between controller 12 and encoder sensor 10.

Figure 2:
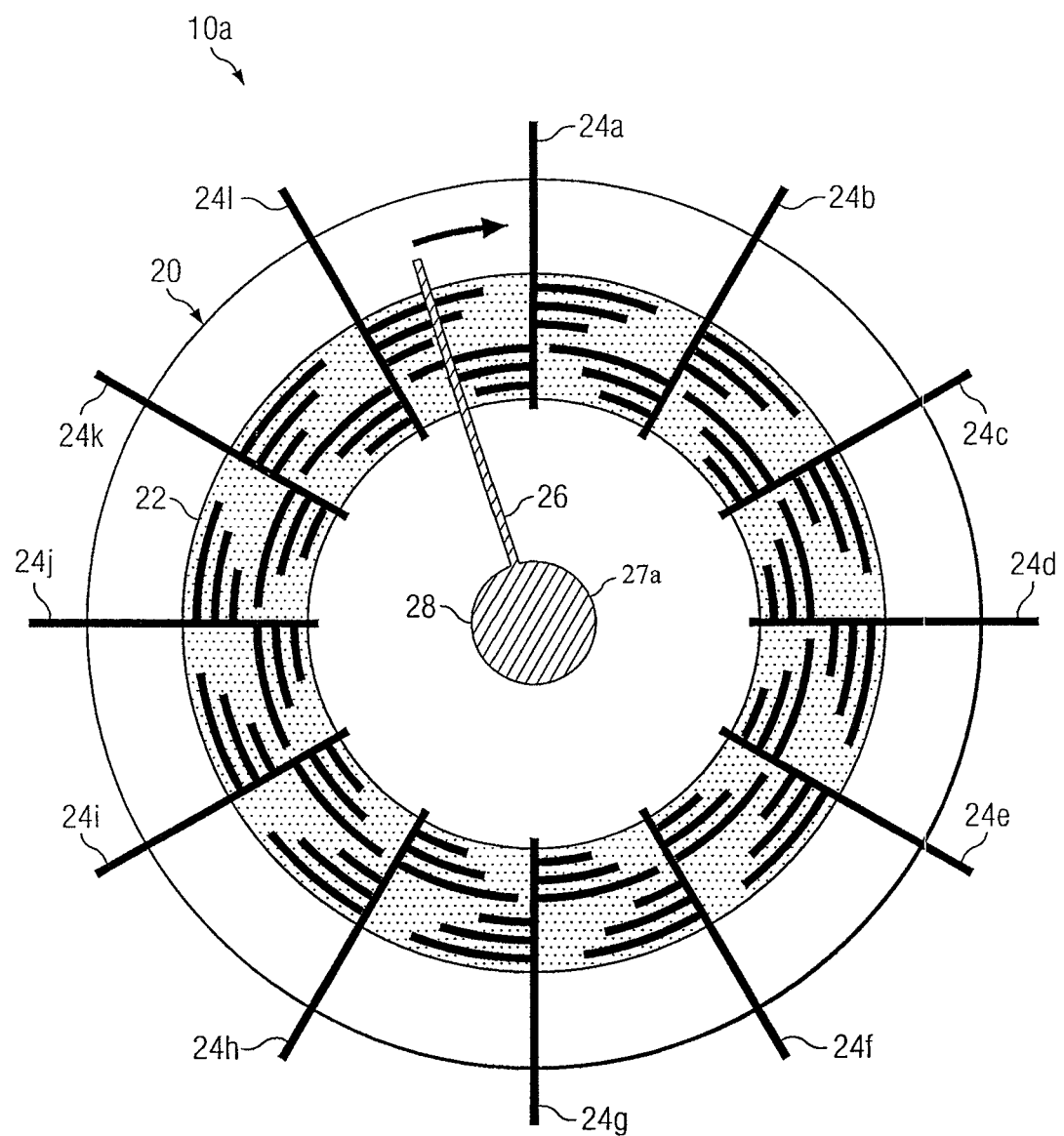
FIG. 2 illustrates an example embodiment of the encoder sensor of FIG. 1 comprising a capacitive rotary sensor with a single wiper arm.

FIG. 2 illustrates an example capacitive rotary encoder sensor 10*a*. Capacitive rotary encoder sensor 10*a* is an example implementation of encoder sensor 10 and may include any suitable characteristics of encoder sensor 10 as described above. Sensor 10*a* includes a substrate 20, a plurality of sense electrodes 24, a drive electrode 22, and a wiper 27*a*. Substrate 20, sense electrodes 24, and drive electrode 22 may respectively have any suitable characteristics of the substrate, the sense electrodes, and the drive electrodes described above in connection with FIG. 1. In the embodiment depicted, wiper 27*a* includes a rotary shaft 28 and a wiper arm 26 that extends in a radial direction from rotary shaft 28.

In the embodiment depicted, capacitive rotary encoder sensor 10*a* includes a drive electrode 22 and sense electrodes 24 formed on substrate 20. In other embodiments, sensor 10*a* may include any suitable number of drive electrodes 22 and sense electrodes 24. In a particular embodiment, the one or more drive electrodes 22 are formed on one side of the substrate 20 and the plurality of sense electrodes 24 are formed on the opposite side of the substrate 20. For example, in the embodiment depicted, sense electrodes 24 are formed on the upward facing side of substrate 20 and drive electrode 22 is formed on the downward facing side of substrate 20. In the embodiment depicted, a single drive electrode 22 has an annular shape and intersects multiple sense electrodes 24 forming a capacitive node with each sense electrode 24. Sense electrodes 24 each have a radial portion that extends toward the center of sensor 10*a* and multiple appendages that extend from the radial portion of the sense electrodes. In the embodiment depicted, the appendages are each generally perpendicular to the radial portion of the sense electrode 24 and follow the curvature of a circle having a circumference coincident with the appendage and a radius at the center of sensor 10*a*. In other embodiments, the appendages may have any suitable shape. The appendages facilitate detection of the position of wiper 27*a* with finer resolution. For example, if wiper arm 26 crosses more appendages of sense electrode 24*l* than sense electrode 24*a* (as depicted in FIG. 2), the wiper arm 26 will have a greater effect on the charge stored by sense electrode 24*l* than on the charge stored by sense electrode 24*a*. Accordingly, controller 12 may determine that the wiper arm 26 is closer to sense electrode 24*l* than to 24*a*.

Wiper 27*a* includes rotary shaft 28 and wiper arm 26. Rotary shaft 28 may be coupled to any suitable object that causes rotary shaft 28 to change position (e.g., rotate in a circle). By way of example, rotary shaft 28 may be mechanically, electrically, magnetically, or otherwise linked to a throttle of an engine, a volume control, a motor shaft, a printer component, or other suitable component of a device that is coupled to or embodies capacitive rotary encoder sensor 10*a*. In particular embodiments, rotary shaft 28 changes position in response to a user action. For example, a user may press a gas pedal, turn a knob, adjust a lever, or perform another action. The user action may cause a component of the device that is mechanically linked to rotary shaft 28 to rotate, also causing rotary shaft 28 to turn. By detecting the position of wiper 27*a*, the position of the component coupled to the wiper may also be determined.

Wiper arm 26 is disposed adjacent the side of the substrate 20 upon which the sense electrodes 24 are formed. Wiper arm 26 may be disposed such that an air gap or other low friction dielectric is situated in between the wiper arm 26 and the sense electrodes 24 that it intersects as it is rotated. Accordingly, wiper arm 26 and sense electrodes 24 may be electrically insulated from each other. As an example, wiper arm 26 may be suspended above the sense electrodes 24. An air gap or other dielectric between wiper arm 26 and sense electrodes 24 may have any suitable thickness, as long as there is sufficient capacitive coupling between wiper arm 26 and sense electrodes 24. As an example and not by way of limitation, wiper arm 26 may be displaced between 0.2 mm and 5 mm above each sense electrode. In a particular embodiment, wiper arm 26 is disposed 1 mm from the sense electrodes 24.

Wiper 27a may comprise any suitable conductive material. In operation, wiper 27a may be coupled to a predetermined voltage, such as ground. The wiper arm 26 capacitively couples with sense electrodes 24 that are near wiper arm 26. For example, wiper arm 26 may capacitively couple with a sense electrode 24 of which at least a portion intersects with wiper arm 26 (e.g., the wiper arm 26 and sense electrode 24 may intersect when they both lie in a common plane that is perpendicular to substrate 20). Similar to a touch or proximity input by an object such as a human finger, the capacitive coupling between wiper arm 26 and a sense electrode changes the capacitance between the sense electrodes 24 and the drive electrode 22, and thus affects the charge stored by the sense electrodes 24. For example, if wiper 27a is coupled to ground and is located in the position shown in FIG. 2, wiper 27a will capacitively couple with sense lines 24a and 24l. This coupling will decrease the capacitive coupling between sense electrode 24a and drive electrode 22 and the capacitive coupling between sense electrode 24l and drive electrode 22. Accordingly, if drive electrode 22 is driven with one or more drive signals while wiper 27a is in the position shown, sense electrodes 24a and 24l will accumulate less charge in response to the drive signals than all of the other sense electrodes 24. Controller 12 may measure the charges stored by each sense electrode 24 and determine the position of wiper 27a based on these measurements. Controller 12 may use the charges measured in relation to each other in determining the position of wiper 27a. For example, as the charge stored by sense electrode 24l increases and the charge stored by sense electrode 24a decreases, the position detected by controller 12 may be closer to sense electrode 24a and further from sense electrode 24l.

In particular embodiments, each sensed charge is converted to a digital value by controller 12. For example, controller 12 may include one or more analog-to-digital converters for converting the measured charges into digital values. Each of these digital values or a subset thereof (e.g., the lowest digital values) are then analyzed to determine the position of wiper 27a. For example, controller 12 may utilize a mathematical algorithm that accepts digital values as inputs and calculates a position of wiper 27a. As another example, controller 12 may utilize lookup table 23 to determine the position of wiper 27a. Lookup table 23 may include a plurality of entries that each correspond to a position of wiper 27a. For example, an entry may correspond to an angle of 0°, the next entry may correspond to 2°, the next entry to 4°, and so on up to 358° (the angles may be indicated with respect to any suitable reference point). Any suitable number of entries and granularity of positions are contemplated by this disclosure. In particular embodiments, multiple entries may correspond to the same angle. Each entry may also indicate a set of digital values. Each digital value may be associated with a particular sense electrode 24. Controller 12 may compare one or more of the digital values obtained by measuring and converting the charges stored by the sense electrodes 24 with one or more sets of digital values of lookup table 23. Controller 12 may locate a match or a best fit and identify the corresponding position as the position of wiper 27a. Although particular methods of determining the position of wiper 27a have been explained, any suitable method of determining the position is contemplated by this disclosure.

In particular embodiments, capacitive position encoder 8 or the rotary encoder sensor 10a may be encased in an enclosure to mitigate electrical interference from other portions of a device that include sensor 10a. The enclosure may be made of any suitable material, such as metal or a metal-based material.

Figure 3:
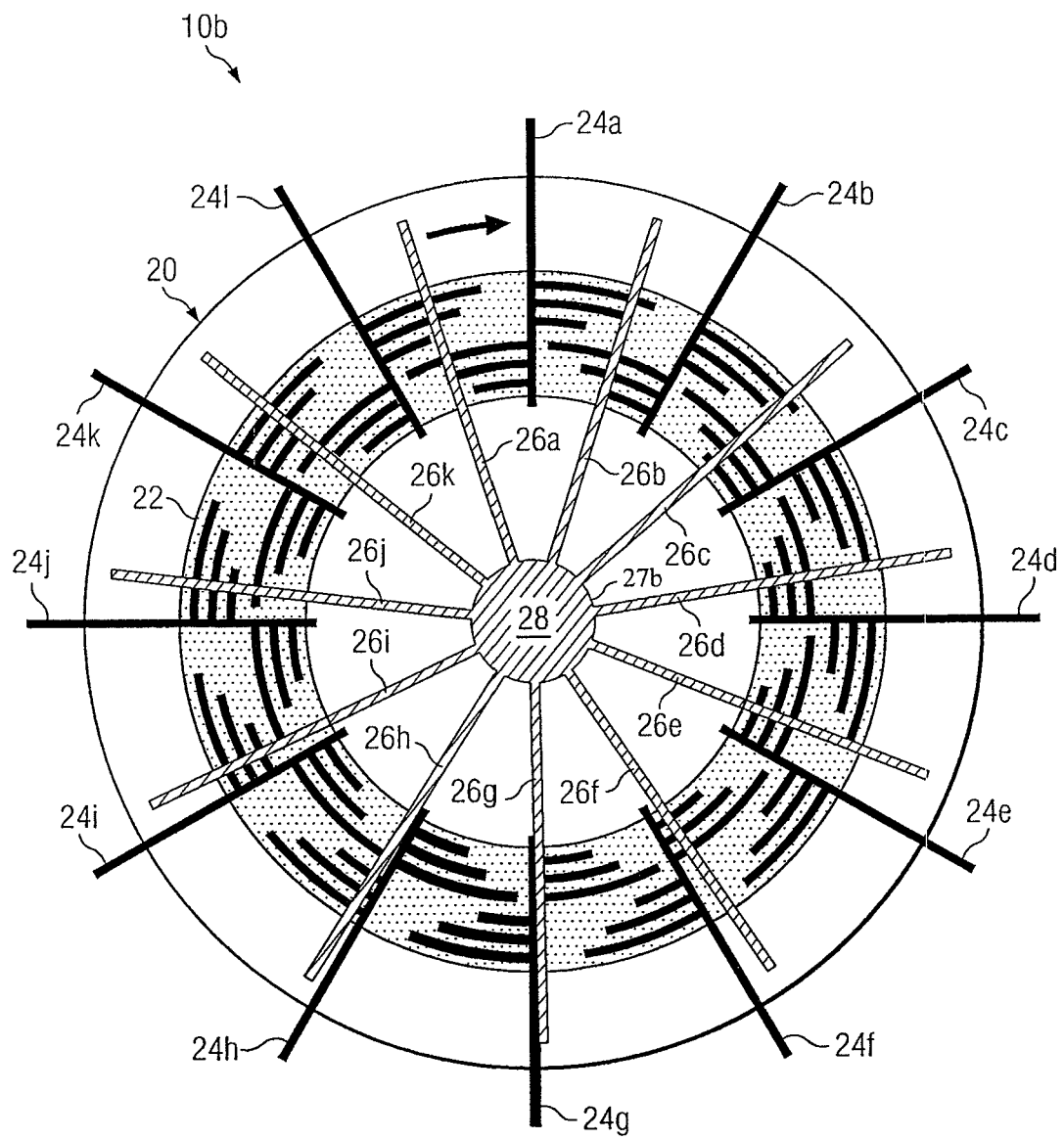
FIG. 3 illustrates another example embodiment of the encoder sensor of FIG. 1 comprising a capacitive rotary sensor with multiple wiper arms.

FIG. 3 illustrates an example capacitive rotary encoder sensor 10b. Capacitive rotary encoder sensor 10b is an example implementation of encoder sensor 10 and may include any suitable characteristics of encoder sensor 10 or encoder sensor 10a as described above. In the embodiment depicted, sensor 10b is identical to sensor 10a, except that wiper 27b includes a plurality of wiper arms 26 that extend in a radial direction from rotary shaft 28. In particular embodiments, the radial angles between adjacent wiper arms is varied such that each position of wiper 27b is unique. That is, the pattern made by wiper arms 26 overlaying sense electrodes 24 when wiper 27b is in a particular position will not be repeated again until wiper 27b has been rotated one complete revolution. Accordingly, each position of wiper 28 results in a unique aggregate effect on the sense electrodes 24. Such embodiments may be accomplished by varying the radial angles in between adjacent wiper arms 26. For example, the radial angle between wiper arms 26a and 26b may be 28°, the radial angle between wiper arms 26b and 26c may be 33°, the radial angle between wiper arms 26c and 26d may be 31°, and so on. In particular embodiments, each successive radial angle between wiper arms 26 may increase by a particular amount. Thus, the radial angle between wiper arms 26a and 26b may be 20°, the radial angle between wiper arms 26b and 26c may be 25°, the radial angle between wiper arms 26c and 26d may be 30°, and so on.

Embodiments utilizing multiple wiper arms 26 allow determination of the position of wiper 27b with greater accuracy than embodiments including a single wiper arm 26 because the multiple wiper arms 26b affect more capacitive nodes thus effectively allowing averaging of multiple measurements in determining the position of wiper 27b. The determination of the position of wiper 27b may be performed in any suitable manner, such as a mathematical algorithm using charges sensed at sense electrodes 24, resolution via lookup table 23, or other suitable method. Although a particular number of wiper arms 26 are depicted in FIG. 3, any suitable number of wiper arms 26 may be used.

Figure 4:
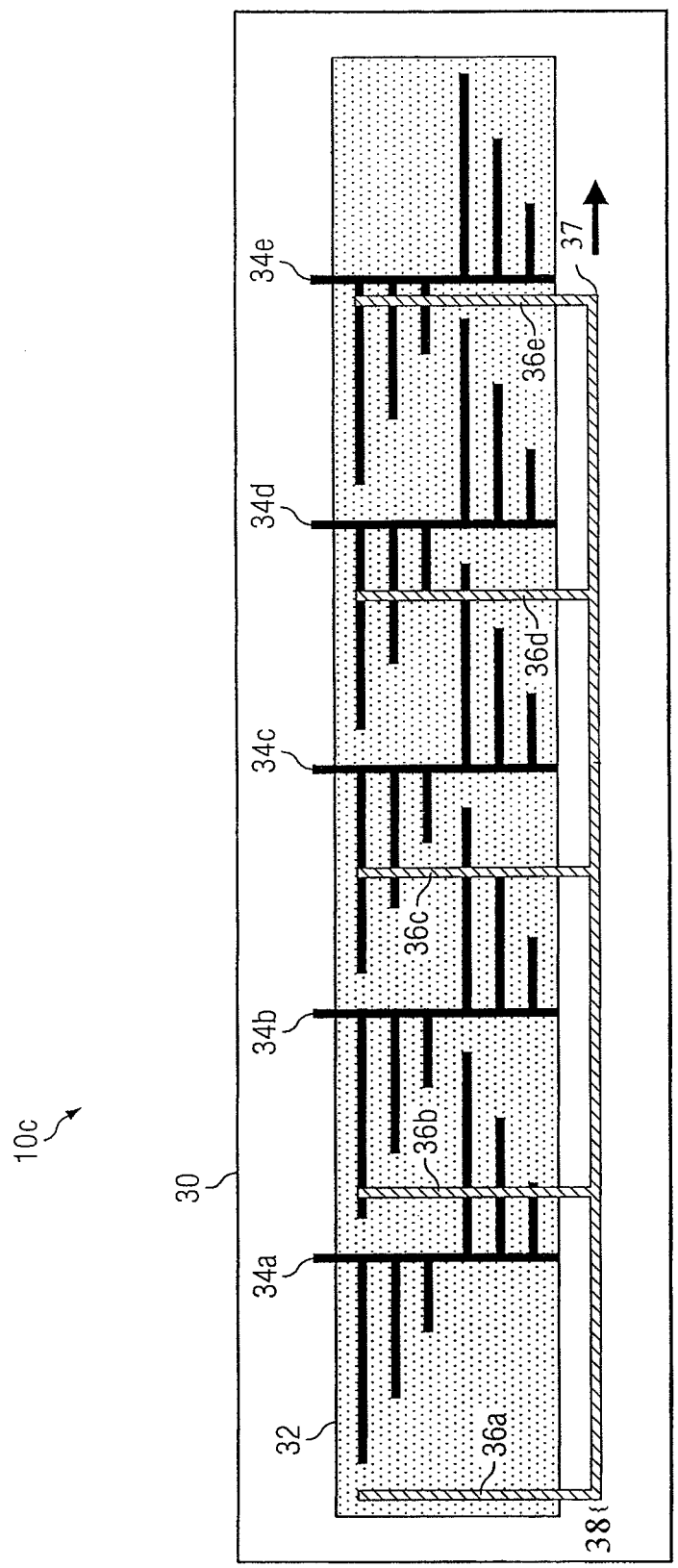
FIG. 4 illustrates another example embodiment of the encoder sensor of FIG. 1 comprising a linear rotary sensor with multiple wiper arms.

FIG. 4 illustrates an example capacitive linear encoder sensor 10c. Capacitive linear encoder sensor 10c is an example implementation of encoder sensor 10 and may include any suitable characteristics of encoder sensor 10, encoder sensor 10a, or encoder sensor 10b as described above. Sensor 10c includes a substrate 30, a plurality of sense electrodes 34, a drive electrode 32, and a wiper 37. Substrate 30, sense electrodes 34, drive electrode 32, and wiper 37 may have any suitable characteristics of substrate 20, sense electrodes 24, drive electrode 22, and wipers 27a and 27b respectively as described above. In the embodiment depicted, wiper 37 includes a linear shaft 38 and multiple wiper arms 36 that extend in a direction perpendicular to linear shaft 38.

Capacitive linear encoder sensor 10c may operate in a manner similar to capacitive rotary encoder 10b except that the sensed position of wiper 37 is a linear displacement rather than an angular position. For example, a component coupled to linear shaft 38 (such as a printer component or other suitable component) may cause the wiper 37 to move in a horizontal direction. Wiper 37 may include any suitable number of wiper arms 36 driven to a predetermined voltage (such as ground) that affect the capacitance of the capacitive nodes formed between sense electrodes 34 and drive electrode 32. Controller 12 may sense the charge stored by sense electrodes 34 and determine a position of wiper 37 based on the sensed charges. Any suitable method may be used for determining the position of wiper 37, such as those described above.

In the embodiment depicted, sense electrodes 34 and drive electrode 32 are formed on opposite sides of substrate 30. Wiper 37 may be disposed on the same side of the substrate 30 as sense electrodes 34 with an air gap or other dielectric present between wiper arms 36 and sense electrodes 34. In the embodiment depicted, sense electrodes 34 include a vertical component and a plurality of appendages that extend in a perpendicular direction from the vertical component and drive electrode 32 has a rectangular shape that encompasses the sense electrodes 34. In other embodiments, sensor 10c may have any suitable number of drive electrodes 32 or sense electrodes 34 with any suitable shapes. In particular embodiments, the distances between adjacent wiper arms 34 is the same for each adjacent wiper arm pair. In other embodiments, these distances may be varied.

Figure 5:
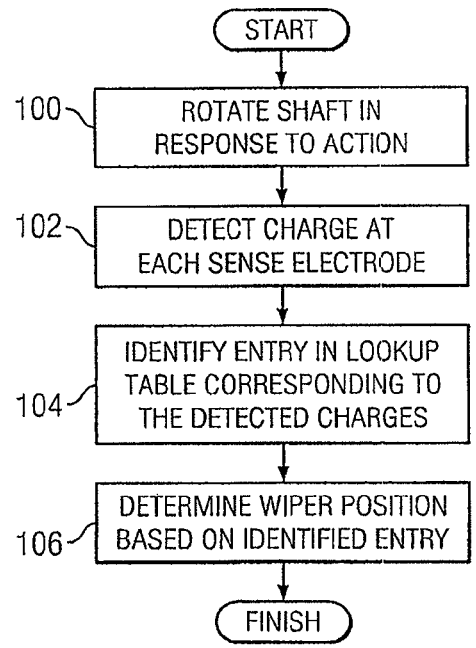
FIG. 5 illustrates an example method for detecting a position of a wiper using the capacitive position encoder of FIG. 1.

FIG. 5 illustrates an example method for detecting a position of a wiper using the capacitive position encoder 8. The method may be used with any suitable type of encoder, such as a rotary encoder or linear encoder. The method begins at step 100 where a shaft is moved in response to an action. The shaft may move in response to any suitable action. For example the action may be movement by a component coupled to a shaft. In particular embodiments, the movement is caused by a user action. For example, the user action may include the pressing of a gas pedal, the turning of a knob, the movement of a lever, or other suitable user action. The movement of the shaft may cause one or more wiper arms coupled to the shaft to move. In particular embodiments, these wiper arms are coupled to ground and affect the capacitance of nearby capacitive nodes.

At step 102, the charge at each sense electrode is detected. In particular embodiments, sense unit 15 of controller 12 may measure these charges. The measurement of charges may be performed in response to the provision of one or more drive signals to one or more drive electrodes by drive unit 13. In particular embodiments, controller 12 converts the measured charges into digital values using one or more ADCs.

At step 104, an entry of a lookup table 23 is identified based on the detected charges. For example, an entry may include a set of charge values that are each associated with a sense electrode of encoder sensor 10. The measured charge values may be compared against the sets of charge values in the lookup table to identify the set of charge values that best matches the measured values. At step 106, the wiper position is determined based on the identified entry. For example, the identified entry of the lookup table may include or otherwise be associated with a position, such as an angular position or linear position.

Particular embodiments may repeat the steps of the method of FIG. 5, where appropriate. Moreover, although this disclosure describes and illustrates particular steps of the method of FIG. 5 as occurring in a particular order, this disclosure contemplates any suitable steps of the method of FIG. 5 occurring in any suitable order. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Particular embodiments of the present disclosure may provide one or more or none of the following technical advantages. In particular embodiments, the position of a wiper may be detected using capacitive sensing techniques. A technical advantage of one embodiment includes the ability to determine the position of a wiper based on charge collected by sensor electrodes. Another technical advantage of one embodiment may include increasing the accuracy of position detection using multiple wiper arms. Another technical advantage of one embodiment may include increasing the life of an encoder sensor by including an air gap between a wiper and sense electrodes of the encoder sensor. Certain embodiments of the present disclosure may include none, some, or all of the above technical advantages. One or more other technical advantages may be readily apparent to one skilled in the art in view of the figures, descriptions, and claims of the present disclosure.

Herein, reference to memory or a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A memory or computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. For example, the figures depicted herein are not necessarily drawn to scale and any suitable dimensions may be used for any of the components of the figures. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A device comprising:
   a substrate;
   a drive electrode disposed on a first side of the substrate;

a plurality of sense electrodes disposed on a second side of the substrate;

a wiper comprising at least one arm, the wiper electrically insulated from the plurality of sense electrodes, the wiper coupled to a ground of the device; and a controller coupled to the drive electrode and the plurality of sense electrodes, the controller comprising:
- a drive unit configured to generate at least one drive signal and drive the drive electrode with the at least one drive signal;
- a sense unit configured to detect, for each sense electrode of the plurality of sense electrodes, a charge stored by the sense electrode; and
- a processor unit operable to determine a position of the wiper relative to the plurality of sense electrodes, the determination based on the plurality of charges detected by the sense unit.

2. The device of claim 1, wherein the wiper further comprises a rotary shaft coupled to the at least one arm of the wiper.

3. The device of claim 1, wherein the wiper comprises a plurality of arms that extend in a radial direction from a rotary shaft of the wiper.

4. The device of claim 1, wherein at least one radial angle formed between a first pair of adjacent arms of the wiper is different from at least one other radial angle formed between a second pair of adjacent arms of the wiper.

5. The device of claim 1, the drive electrode having an annular shape.

6. The device of claim 1, wherein the wiper further comprises a shaft that extends in a first direction and each of the at least one arm of the wiper extends in a second direction from the shaft, the first direction being perpendicular to the second direction.

7. The device of claim 1, wherein the wiper is configured to change position relative to the plurality of sense electrodes in response to a user action.

8. A method comprising:
- driving one or more drive electrodes former on a substrate with one or more drive signals;
- driving a wiper comprising at least one arm to a predetermined voltage, the wiper electrically insulated from a plurality of sense electrodes formed on the substrate;
- detecting, for each sense electrode of the plurality of sense electrodes, a charge stored by the sense electrode; and
- determining, by a processor, a position of the wiper based on the detected charges stored by the plurality of sense electrodes.

9. The method of claim 8, further comprising changing the position of the wiper in response to a user action.

10. The method of claim 8, wherein the one or more drive electrodes are formed on a first side of the substrate and the plurality of sense electrodes are formed on a second side of the substrate.

11. The method of claim 8, wherein the wiper further comprises a rotary shaft coupled to the at least one arm.

12. The method of claim 8, wherein the wiper comprises a plurality of arms that extend in a radial direction.

13. The method of claim 8, wherein at least one radial angle formed between a first pair of adjacent arms of the wiper is different from at least one other radial angle formed between a second pair of adjacent arms of the wiper.

14. The method of claim 8, wherein the at least one arm of the wiper extends in a first direction from a shaft of the wiper that extends in a second direction, the first direction being perpendicular to the second direction.

15. An apparatus comprising:
- at least one drive electrode disposed on a substrate;
- a plurality of sense electrodes disposed on the substrate;
- a wiper comprising at least one arm, the wiper electrically insulated from the plurality of sense electrodes; and
- a controller operable to:
  - drive the at least one drive electrode;
  - detect a plurality of charges stored by the plurality of sense electrodes; and
  - determine a position of the wiper based on the plurality of charges detected by the sense unit.

16. The apparatus of claim 15, wherein the wiper further comprises a rotary shaft coupled to the at least one arm of the wiper.

17. The apparatus of claim 15, wherein the wiper comprises a plurality of arms that extend in a radial direction from a rotary shaft of the wiper.

18. The apparatus of claim 15, wherein at least one radial angle formed between a first pair of adjacent arms of the wiper is different from at least one other radial angle formed between a second pair of adjacent arms of the wiper.

19. The apparatus of claim 15, the drive electrode having an annular shape.

20. The apparatus of claim 15, wherein the wiper further comprises a shaft that extends in a first direction and each of the at least one arm of the wiper extends in a second direction from the shaft, the first direction being perpendicular to the second direction.

* * * * *

UNITED STATES PATENT AND TRADEMARK OFFICE
CERTIFICATE OF CORRECTION

PATENT NO. : 9,035,663 B2  
APPLICATION NO. : 13/610114  
DATED : May 19, 2015  
INVENTOR(S) : Carl Carley Page 1 of 1

It is certified that error appears in the above-identified patent and that said Letters Patent is hereby corrected as shown below:

In the claims:

Column 11, Line 39: After "drive electrodes" and before "on a substrate" delete "former" and insert --formed--.

Signed and Sealed this
Twenty-ninth Day of March, 2016

Michelle K. Lee
*Director of the United States Patent and Trademark Office*